Figure 1:
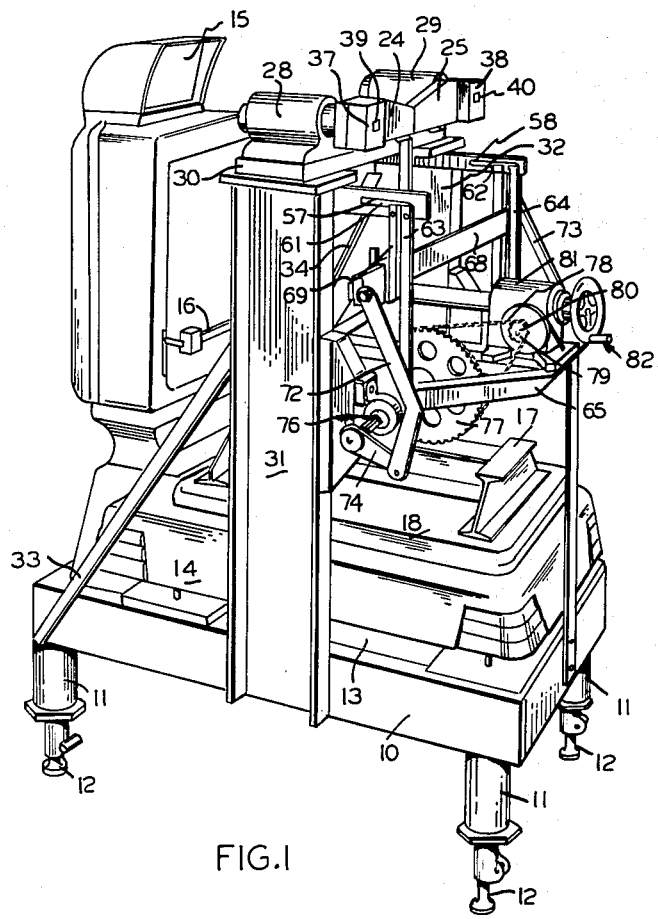

June 14, 1966  K. R. LARSON  3,255,624
APPARATUS FOR TESTING AND CHECKING MEASURING DEVICES
Filed Nov. 13, 1961  5 Sheets-Sheet 1

INVENTOR.
KENNETH R. LARSON
BY
ATTORNEY

June 14, 1966  K. R. LARSON  3,255,624
APPARATUS FOR TESTING AND CHECKING MEASURING DEVICES
Filed Nov. 13, 1961  5 Sheets-Sheet 2

INVENTOR.
KENNETH R. LARSON
BY
ATTORNEY

June 14, 1966   K. R. LARSON   3,255,624
APPARATUS FOR TESTING AND CHECKING MEASURING DEVICES
Filed Nov. 13, 1961   5 Sheets-Sheet 3

INVENTOR.
KENNETH R. LARSON
BY
ATTORNEY

June 14, 1966  K. R. LARSON  3,255,624
APPARATUS FOR TESTING AND CHECKING MEASURING DEVICES
Filed Nov. 13, 1961  5 Sheets-Sheet 4

INVENTOR.
KENNETH R. LARSON
BY
ATTORNEY

INVENTOR.
KENNETH R. LARSON
ATTORNEY

United States Patent Office 3,255,624
Patented June 14, 1966

3,255,624
APPARATUS FOR TESTING AND CHECKING MEASURING DEVICES
Kenneth R. Larson, Des Plaines, Ill., assignor to Snap-On Tools Corporation, Kenosha, Wis., a corporation of Delaware
Filed Nov. 13, 1961, Ser. No. 152,969
20 Claims. (Cl. 73—1)

This invention relates to apparatus for checking the accuracy of measuring devices and more particularly to torque wrench testing apparatus, although it may be employed with equal advantage for other purposes.

It contemplates more especially the provision of instrumentalities in combination with any suitable calibrated apparatus such as an accurate weighing scale, to adapt the measuring device to be tested such as a torque wrench to respond upon mechanical actuation to the calibrated standard such as a weighing scale so that the load sustained by the device to be tested, will be translated to the weighing scale without introducing any inaccuracies in the translation or movement of the parts.

Most testing devices are rather intricate precision apparatus which is exceedingly expensive and does not lend itself to mass adoption. They are primarily laboratory apparatus of a scientific character that is too sensitive and involved for the average shop attendant to use with any degree of dispatch. In order to afford adequate testing of measuring devices such as torque wrenches in a factory or repair center where torque wrenches are used in numbers and to enable the average users to test their own measuring tools, a simple and comparatively inexpensive testing and checking device has been provided which has as its base a standard and easily interpreted weighing scale preferably of the platform type. By adapting mechanical actuators for the device to be tested and comparing readings thereon with the reading on an accurate measuring device such as a platform scale to which the load is translated, a fast and dependable check can be made by resort to a simple and comparatively inexpensive checking apparatus.

One object of the present invention is to provide a simple and dependable apparatus for checking the accuracy of measuring devices such as torque wrenches used in increasing numbers in shops, repair centers and on production lines.

Another object is to provide a new and novel load translating device for adapting the testing of torque wrenches and similar measuring devices to the accurate responses of a platform scale or the like.

Still another object is to provide simple and effective instrumentalities for actuating a measuring device such as a torque wrench and to translate the load imparted hereto for registry with a standard scale to check the accuracy thereof and to enable prompt adjustment should there be any variation.

A further object is to provide a weighing scale with instrumentalities for mounting and actuation of torque wrenches and the like thereon and checking the readings between them to determine the accuracy of the device being checked therewith.

A still further object is to utilize the power advantage of a reduction train of gears in conjunction with load translating instrumentalities for rendering a platform scale accurately responsive thereto.

Other objects and advantages will appear from the following description of an illustrated embodiment of the present invention.

In the drawings:
FIGURE 1 is a perspective view of a structure embodying features of the present invention.

Figure 2:
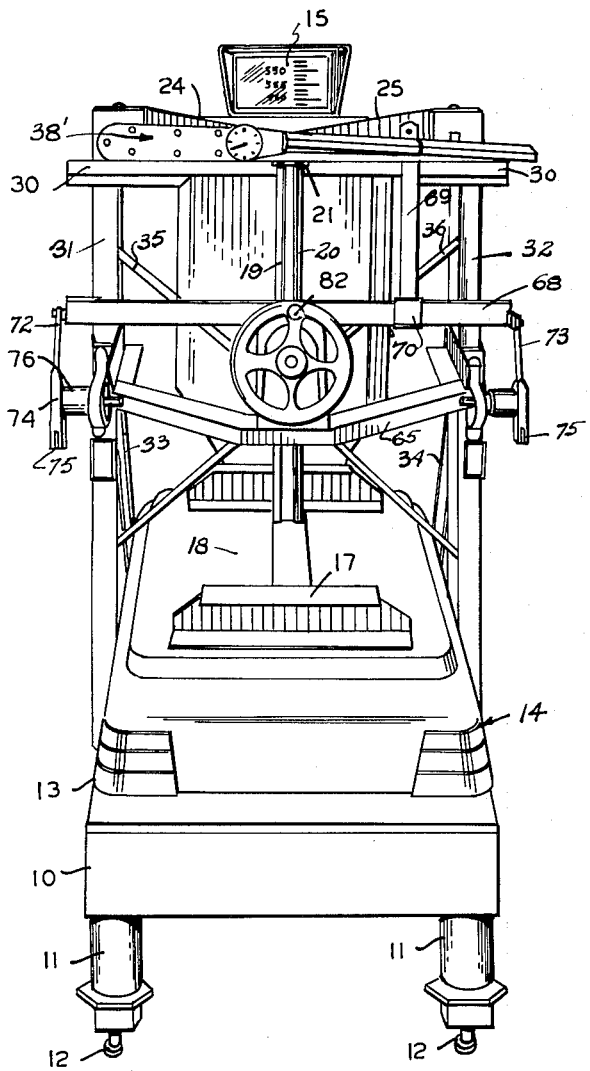
Figure 3:
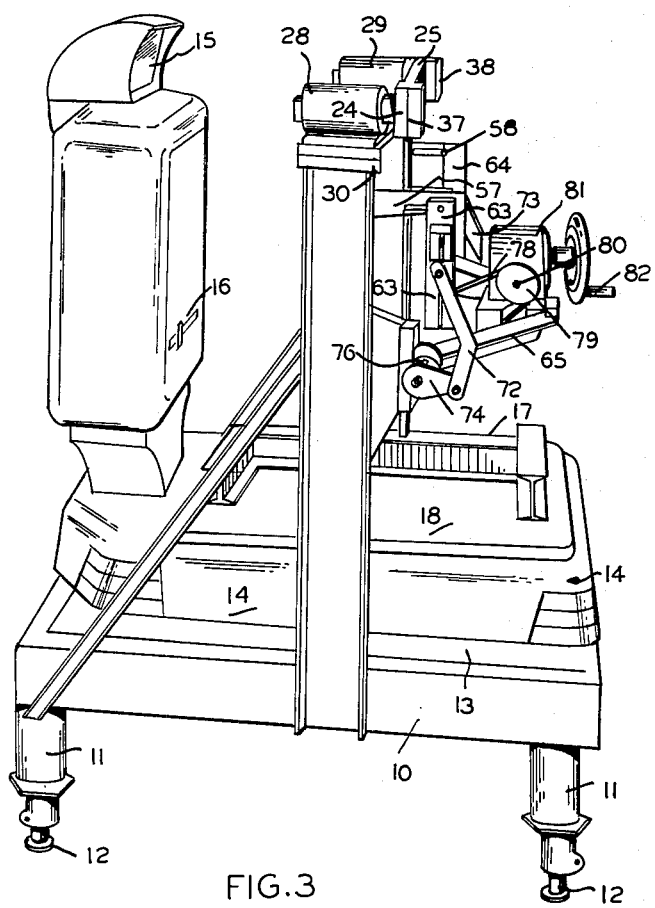
Figure 4:
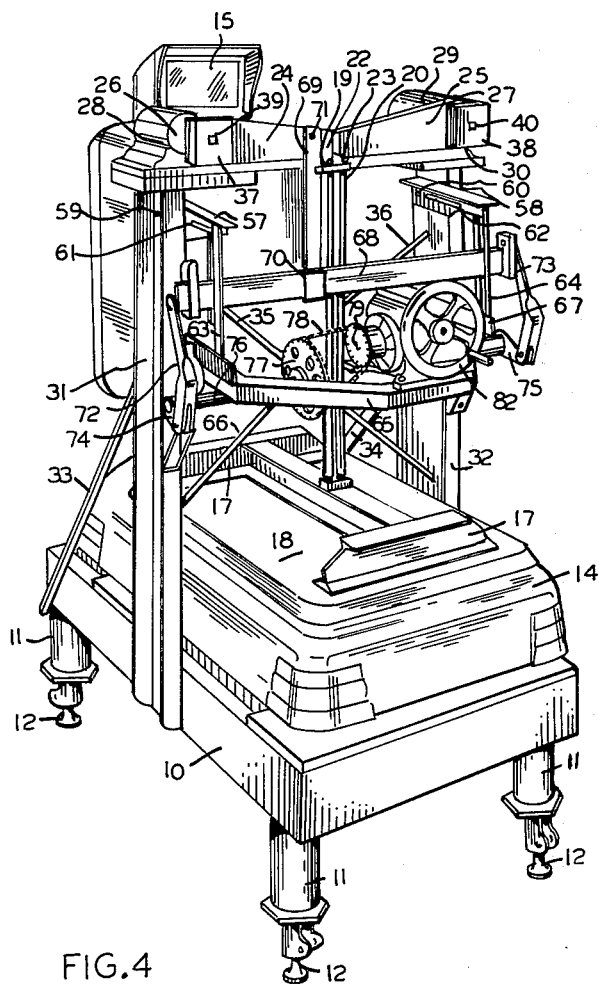
Figure 5:
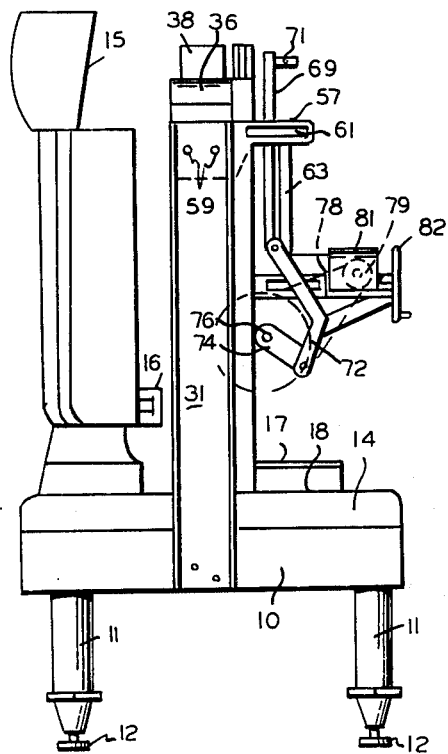
Figure 6:
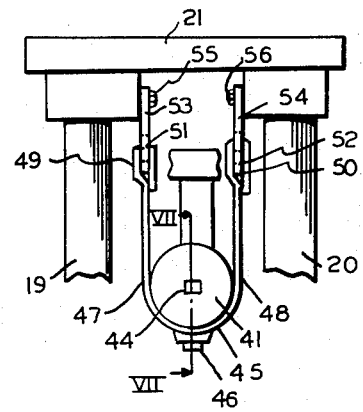
Figure 7:
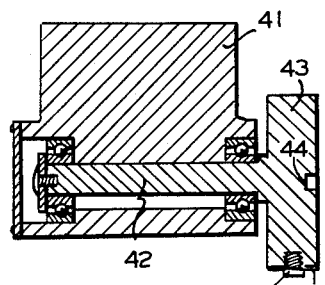
Figure 8:
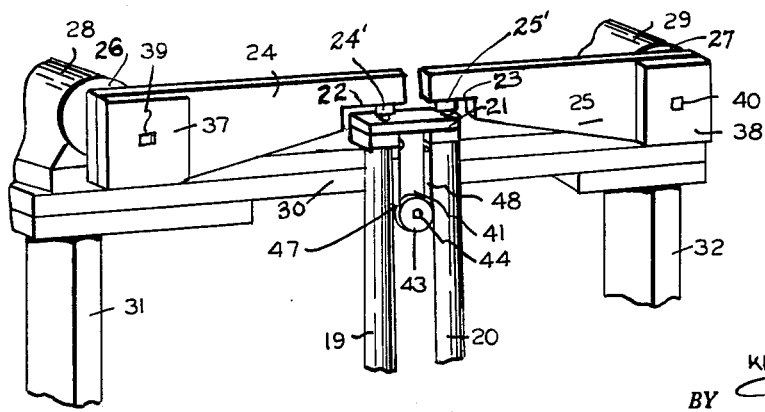

FIGURE 2 is a front view slightly in perspective of the device shown in FIGURE 1.
FIGURE 3 is a side view slightly in perspective of the device shown in the preceding figures.
FIGURE 4 is a perspective corner view of the device shown in the preceding figures.
FIGURE 5 is a side view in elevation of the device shown in the preceding figures.
FIGURE 6 is a fragmentary front view in elevation of an attachment to the main platform operating instrumentalities for measuring very small measuring devices such as torque screw drivers and small capacity torque wrenches.
FIGURE 7 is a fragmentary sectional view taken substantially along line VII—VII of FIGURE 6.
FIGURE 8 is a fragmentary perspective view enlarged of the attachment illustrated in FIGURES 6 and 7.

The structure selected for illustration is not intended to serve as a limitation upon the scope or teachings of the invention, but is merely illustrative thereof. There may be considerable variations and adaptations of all or part of the teachings thereof depending upon the dictates of commercial practice. The present invention comprises a base 10 supported by corner standards 11 which have floor levelling feet 12 to provide a flat level surface 13 on which a suitable and standard platform scale 14 is mounted to function independently of the base and the framing attached thereto. In other words, the operation of the scale 14 is in no way modified by the frame upon which it rests. The platform scale 14 should be of the type that preferably though not essentially has an enlarged illuminated viewing scale 15 and a compensating weight slide scale 16 to enable initial balancing of the instrumentalities to bring the scale 15 to its initial zero reading. This type of scale is conventional and known on the market.

A substantially I-shaped frame 17 is mounted on the platform 18 of the scale 14 in a balanced position thereon to receive and support adjacently disposed and parallel vertical rods 19–20 resting upon substantially the center of the I-shaped frame 17 which preferably should also to the center of the weighing scale platform 18. The load transmitting rods 19–20 are provided at their upper ends with a plate 21' which in turn contact the axially adjustable recessed balls 24'–25' provided in the lower edge extremities 22–23 of confronting normally horizontally disposed bracket arms 24–25 which are anchored to bearings 26–27 provided in brackets 28–29 supported by a cross-plate 30. The cross-plate 30 is rigidly fixed between for horizontal support on vertical channel members 31–32 which extend downwardly for fixed attachment to and support from the sides of the base 10 to provide a rigid support for the substantially rectangular rigid frame superstructure defined by the members 30–31–32–10.

This superstructure supports the instrumentalities 19–20–24–25–26–27–28–29 free of any weight or load on the platform 18 of the scale 14 or at least the load on the platform is negligible and reduced to zero by the compensating slide weight 16 comprising part of the standard scale 14. With this arrangement, the bracket arms 24–25 are nicely balanced in an initial horizontally aligned and confronting position for free pivotal movement so that their extremities 22–23 may descend against the vertical load transmitting rods 19–20 against which they are initially adjusted for contact and fulcrumed through the recessed balls 24'–25'. It should be noted that the rigid frame 30–31–32–10 is held fast against any possible movement by reinforcing inclined braces 33–34 welded or otherwise joined to the side members 31–32 of the upright frame and the sides of the base 10. Further, cross-rods 35–36 are welded between the confronting interior faces of the uprights 31–32 to further maintain the frame upright 30–31–32–10 against any possible relative movement between the parts thereof to insure that the calibrated load will always be transmitted to the platform 18 in its entirety and without variation from time-to-time in the repeated use thereof.

As shown, the bracket arms 24–25 have reinforcing hub plates 37–38 welded or otherwise joined to the pivotal ends thereof to provide a tight connection with the bearings in the bearing brackets 28–29 for registry of the drive shaft end of torque wrenches 38' with complemental polygonal recessess 39–40 provided axially in the hub plates 37–38 relative to the bearings within the bearing brackets 28–29. This affords the loading of the bracket arm 24 or bracket arm 25 depending upon the direction in which the torque wrench is being tested or checked for either tightening or loosening of the fasteners in the normal use thereof. To this end, the torque wrenches usually are provided with a divided calibrated scale to read in either direction of nut fastening or loosening or the reverse for left-hand threads as the case may be. In order to increase the range or capacity of such testing and checking devices and to accommodate small load measuring tools such as torque screw drivers and small torque wrenches that measure inch pounds instead of foot pounds in the case of the standard torque wrench sizes, an attachment is provided for direct mounting on the upstanding load transmitting rods 19–20 (FIGURE 6). This attachment comprises a bearing bracket (FIGURE 7) having an axial shaft 42 therein to terminate outwardly in a hub member or plate 43 in which a rectangular recess 44 is axially provided much like the hub plates 37–38 in relation to the bearing brackets 28–29; however, the polygonal recesses 39–40 in hub plates 37–38 are exactly one foot from the translating rods 19–20 while polygonal recess 44 for the inch pound translation of the load is directly above the scale platform so that equivalent deflection of the scale 15 will be effected for say ten foot-pounds by a wrench coupled with either recess 39 or 40 and a load of ten inch-pounds by a small screwdriver or inch pound wrench coupled with the recess 44 in the hub member or plate 43.

In order to translate the turning load imparted to the hub plate 43 by the screwdriver or inch-pound wrench to be tested or checked, a flexible steel band 45 is anchored to the hub plate 43 as at 46 to present two equal portions 47–48 which terminate upwardly after enveloping the bottom half of the circular hub plate 43. The equal band portions 47–48 terminate in closed looped ends 49–50 which register with rectangular openings 51–52 in depending plates 53–54 anchored as at 55–56 to the top ends of the translating rods 19–20. In one direction of rotation of the hub plate 43, one half of the steel band 47–48 will be under tension while the other half will be riding up in the elongated opening 51 or 52 depending upon the direction of rotation of the hub plate 43 by the screw driver or small torque wrench. As a result, the same apparatus may be used for small and large torque wrenches, screwdrivers and the like to test or check the accuracy thereof against the dependable scale 14 without resort to extensive and precise testing machines usable only in laboratories.

In order to actuate the torque wrenches to any predetermined load while the polygonal drive thereof is in registry with either bracket arm recess 39 or 40, linkage is provided which will give a decided applied force advantage so that the largest torque wrenches can be manually loaded and tested or checked. To this end, brackets 57–58 extend forwardly from the top of the uprights 31–32 for anchored mounting as at 59–60 (FIGURE 4) to present slotted openings 61–62 for the attachment of vertically slotted plates 63–64 which depend therefrom for connection at their bottom to a horizontally disposed rigid shelf 65 positioned above the scale platform 18 for fixed mounting through brackets 66–67 against the interior sides of the vertical uprights 31–32. A horizontally disposed bar 68 rides up and down in the vertically slotted guide plates 63–64 to operate a vertically disposed connecting rod 69 having a guide bracket 70 at its lower end to serve as a slide over the horizontal bar 68. The connecting rod 69 carries a rearwardly projecting stud 71 which is in the path of the handle of the torque wrench as it is horizontally disposed with its drive shaft in registry with either the bracket arm recess 39 or 40. To this end, the connecting rod 69 with its stud 71 can be displaced laterally along the bar 68 and vertically in the slots of the plates 63–64 so that engagement of the connecting rod stud 71 with the handle of the wrench can always be effected from above and to exert a force downwardly against the wrench handle which in turn will actuate the bracket arm 24 or 25 depending upon the direction of the test and the bracket arm recess 39 or 40 which is engaged. The connecting rod 69 with its stud 71 can be adjusted to engage the torque wrench handle in either position on the bracket arm 24 or 25.

It should be noted that the ends of the horizontal guide bar 68 are pivotally engaged by angularly shaped links or levers 72–73 which, in turn, are connected to crank arms 74–75 fixedly connected to a cross-shaft 76 journalled for rotation in the shelf bracket 65. The shaft 72 carries a sprocket wheel 77 to mesh with a chain 78 that connects to a pinion 79 carried by a stub shaft 80 comprising part of a reduction gear housing 81. The reduction gear housing 81 is, in this instance, of a 40 to 1 ratio of standard construction which is supported on the bracket shelf 65 for operation in the usual manner through the manual rotation of a crank arm wheel 82 which will easily pull the connecting rod 69 with its stud 71 downwardly to flex the torque wrench (shown in FIG. 2) and impress any desired load thereon to make a comparison between the reading on its dial and that of the weighing scale 14–15. This comparison will determine at a glance if the wrench is properly calibrated and accurate. In the case of the inch-pound screwdriver or wrench which is directly inserted for registry with the circular hub plate 41 (FIGURES 6 and 8), it is unnecessary to use the reduction gear housing 81 and the connecting rod member 69–71 in that the capacity of these small torque measuring tools is well within the capacity of any adult to flex to its load limit without resort to the force or load applying instrumentalities 69–71–81–82.

It will be apparent that with this arrangement of parts, a comparatively simple and inexpensive testing and checking device has been provided for torque wrenches and screwdrivers of the calibrated dial measuring type to insure their accuracy and proper adjustment at all times, and to be able to test such devices of a wide range in capacities so that minimum equipment is involved. While I have illustrated and described a preferred embodiment of my invention, it must be understood that my invention is capable of considerable variation and modification without departing from the spirit of the invention. I, therefore, do not wish to be limited to the precise details of construction set forth, but desire to avail myself of such variations and modifications as come within the scope of the appended claims.

I claim:

1. A torque measuring and testing mechanism comprising a frame, a standard weight or pressure responsive element as part of a measuring instrumentality positioned on said frame to function independently thereof, said weight measuring instrumentality having a calibrated dial capable of ready viewing, confronting arms pivotally mounted to said frame in a plane normal to the weight or pressure responsive element of said measuring instrumentality, a fulcrum supporting plate mounted between said weight or pressure responsive element and said confronting arms, fulcrums mounted near the extremities of said confronting arms to contact said fulcrum supporting plate, and means contacting said pressure responsive element and said arms, at a predetermined distance from said fulcrums to constitute an accurate moment arm for each of said pivotal confronting arms, whereby a calibrated measuring device may be connected to one or the other of said confronting arms for impressing increment forces therewith for direct progressive comparison of increment readings on said calibrated measuring device and the calibrated dial of said weight measuring instrumentality.

2. A mechanism defined in claim 1 wherein manual flexing means are engageable with the calibrated measuring devices to impress the force therewith in relation to the weight measuring instrumentality through said fulcrum supporting plate.

3. A mechanism defined in claim 2 wherein the manual flexing means embodies linkage operated by a speed reducing instrumentality to impress forces of any magnitude within the range of the weight measuring instrumentality and calibrated measuring device being tested.

4. A mechanism defined in claim 2 wherein the manual flexing means includes linkage that is adjustable to variable lengths of the calibrated measuring device within the range of said weight measuring instrumentality.

5. A mechanism defined in claim 4 wherein said flexing means and linkage is slidably adjustable relative to the moment arm of both the confronting pivotal arms and the calibrated measuring device being tested.

6. A mechanism defined in claim 2 wherein the weight measuring instrumentality has a weighing platform and force transmitting members are interposed between said weighing platform and said fulcrum supporting plate.

7. A mechanism defined in claim 6 wherein the substantially frictionless fulcrums comprise free rotating balls interposed between said confronting arms and said fulcrum supporting plate.

8. A mechanism defined in claim 1 wherein the substantially frictionless fulcrums comprise free rotating balls interposed between said confronting arms and said fulcrum supporting plate.

9. A torque measuring and testing mechanism comprising a weight measuring scale with a flat horizontal platform and a calibrated viewing dial, a vertical frame member having a base for supporting said weight measuring scale to function independently thereof, end-to-end confronting arms pivotally mounted to said vertical frame, force transmitting rigid members extending between said scale platform and said arms at a predetermined distance from the pivotal point mounts thereof, fulcrums interposed between said force transmitting rigid members and said confronting arms, means provided axially of the confronting arm pivots to mount torque measuring elongated devices to one or the other of said confronting arms, and means on said frame for adjustably engaging the handle of torque measuring devices associated with said axial confronting arm mounts to impart a progressively turning moment force thereto for sequentially registering load readings on both the torque measuring device and scale dials to progressively check the accuracy of the former against the latter within the capacity of the torque measuring elongated devices without interrupting adjustments.

10. A torque measuring and testing mechanism defined in claim 9 wherein the fulcrums comprise substantially frictionless balls mounted to said confronting arms at a predetermined moment arm's length from the pivot mounts thereof.

11. A torque measuring and testing mechanism defined in claim 9 wherein the turning moment force imparting means include a speed reducer for impressing forces of any magnitude within the range of the torque measuring devices to be checked relative to said scale readings.

12. A torque wrench measuring and testing mechanism defined in claim 11 wherein the handle engaging means are laterally adjustable to conform to torque wrenches of varying sizes within the range of said weight measuring scale.

13. A torque wrench measuring and testing mechanism defined in claim 12 wherein the fulcrums comprise substantially frictionless balls mounted to said confronting arms at a predetermined moment arm's length from the pivot mounts thereof.

14. A torque wrench measuring and testing mechanism defined in claim 10 wherein the torque wrench handle engaging means are laterally slidable to engage the handles of torque wrenches of different lengths and mounted to either confronting arm depending upon the direction of swinging the torque wrench under test for either turning fasteners on or off or both.

15. A torque wrench measuring and testing mechanism defined in claim 14 wherein the turning moment force imparting means include a speed reducer for impressing a smooth sequence of different torque values and retaining the actuated torque wrench under test at any value.

16. A torque wrench measuring and testing mechanism defined in claim 15 wherein the speed reducer is operatively connected to the turning moment force imparting means through linkage and sprockets to provide a readily operable manual control with a force advantage at the expense of speed.

17. A torque wrench measuring and testing device defined in claim 12 wherein the handle engaging means are rendered laterally adjustable by a cross-bar and a slidable connection between the cross-bar and said torque wrench handle engaging means.

18. A torque wrench measuring and testing device defined in claim 17 wherein the speed reducer is operatively connected to both ends of said cross-bar through linkage and sprocket drive elements to provide a readily operable manual control for operating torque wrenches within a wide range of values to simulate actual conditions of use.

19. A torque wrench measuring and testing device defined in claim 18 wherein the fulcrums comprise substantially frictionless balls mounted to said confronting arms at a predetermined moment arm's length from the pivot mounts thereof.

20. A torque wrench measuring and testing device defined in claim 19 wherein the force transmitting rigid members have a common base support on said scale platform and operate separately with respect to each confronting arm so that one or the other may be utilized without affecting the other arm to which a torque wrench is not fitted.

References Cited by the Examiner

UNITED STATES PATENTS

| | | | |
|---|---|---|---|
| 2,342,919 | 2/1944 | Chapman | 73—1 |
| 2,909,055 | 10/1959 | Fish | 73—1 |
| 3,011,332 | 12/1961 | Skidmore | 73—1 |

ISAAC LISANN, *Primary Examiner.*

S. S. MATTHEWS, *Assistant Examiner.*